(12) United States Patent
Amport et al.

(10) Patent No.: US 8,681,960 B2
(45) Date of Patent: Mar. 25, 2014

(54) EXTENDING ORIGINATING CAPABILITIES OF A SUBSCRIBER TO DEVICES IN ANY TELEPHONY NETWORK

(75) Inventors: Carl W. Amport, Oswego, IL (US); Jon R. Diener, Naperville, IL (US); John P. Ernst, Warrenville, IL (US); Alan E. Frey, Naperville, IL (US); John A. Kerkstra, Naperville, IL (US); Simon S. Ou, Naperville, IL (US); Neenendra R. Pandya, Naperville, IL (US); John H. Schick, Plainfield, IL (US); Andrew B. Struble, Woodridge, IL (US); Norman R Tiedemann, Woodbury, MN (US); Robert A. Trygar, Winfield, IL (US)

(73) Assignee: 8631654 Canada Inc., Ottawa, Ontario (CA)

( * ) Notice: Subject to any disclaimer, the term of this patent is extended or adjusted under 35 U.S.C. 154(b) by 1708 days.

(21) Appl. No.: 11/897,283

(22) Filed: Aug. 30, 2007

(65) Prior Publication Data
US 2009/0060150 A1    Mar. 5, 2009

(51) Int. Cl.
*H04M 3/42* (2006.01)
*H04L 12/66* (2006.01)
*H04M 7/00* (2006.01)

(52) U.S. Cl.
USPC ...... 379/201.01; 370/352; 370/354; 370/356; 370/401; 379/88.17; 379/220.01; 455/414.1

(58) Field of Classification Search
USPC .......... 370/352–356, 401; 379/88.17, 201.01, 379/219, 220.01, 221.08, 230; 455/414.1
See application file for complete search history.

(56) References Cited

U.S. PATENT DOCUMENTS

| | | | |
|---|---|---|---|
| 5,574,780 A | 11/1996 | Andruska et al. | |
| 5,668,860 A | 9/1997 | Andruska et al. | |
| 7,710,950 B2 * | 5/2010 | Buckley et al. | 370/354 |
| 7,995,565 B2 * | 8/2011 | Buckley et al. | 370/353 |
| 2002/0196775 A1 * | 12/2002 | Tuohino et al. | 370/352 |
| 2007/0061397 A1 * | 3/2007 | Gregorat et al. | 709/203 |
| 2007/0121608 A1 * | 5/2007 | Gu et al. | 370/356 |
| 2007/0274289 A1 * | 11/2007 | Buckley et al. | 370/351 |
| 2008/0080480 A1 * | 4/2008 | Buckley et al. | 370/352 |
| 2008/0112395 A1 * | 5/2008 | Zhu et al. | 370/352 |
| 2008/0137646 A1 * | 6/2008 | Agarwal et al. | 370/352 |
| 2008/0268824 A1 * | 10/2008 | Allen et al. | 455/415 |

* cited by examiner

*Primary Examiner* — Harry Hong
(74) *Attorney, Agent, or Firm* — Volpe and Koenig, P.C.

(57) ABSTRACT

An exemplary method provides access to call origination features contained in an internet protocol multimedia subsystem (IMS) for a subscriber of the IMS who originates a call request from customer premises equipment (CPE) outside of the IMS. The call request is received at a public service identity (PSI) server in the IMS with a phone number to which the call request is routed. An IMS internal desk number is retrieved based on the number of the outside CPE. A first modified call request is transmitted from the PSI server to a telephony application server (TAS) identifying the IMS internal desk number as a request universal resource identity (RURI). Call origination treatment as specified by the subscriber is performed by the TAS. The first modified call request is processed by the TAS to form a second modified call request in which the RURI is a number of a destination party and a P-asserted identity (PAID) is the IMS internal desk number such that the second modified call request appears as if it was initiated from a phone within the IMS. The second modified call request is transmitted to a node in the IMS for further processing and ultimately termination at the destination party.

18 Claims, 3 Drawing Sheets

EXTENDING ORIGINATING CAPABILITIES OF A SUBSCRIBER TO DEVICES IN ANY TELEPHONY NETWORK

BACKGROUND

This invention relates to telephone networks, and more specifically to call origination processing.

Telephone subscribers are provided with a variety of services, some of which are provided as optional services requiring an additional payment by a subscriber electing such services. Plain old telephone service (POTS) subscribers of the public switched telephone network (PSTN) have access to a variety of standard features such as three-way conference calling, speed dialing, etc. These features are provided by the PSTN switch that supports call origination services its subscribers, i.e. the switch to which the subscriber's telephone lines are connected. The services are normally associated with a particular telephone line termination on the switch. These services are provided to the subscriber only on the predetermined telephone line of the subscriber.

For groups of devices with a common affiliation, e.g. multiple phones belonging to a specific subscriber like a desk phone, cellular phone, and/or softphone, it is many times desirable to provide a common user experience for a call originating from (or terminating to) that device. Normally, such devices are supported by different networks despite the fact that they are owned by the same subscriber. Because of this fact, user experience for the subscriber can vary based on: 1. the implementation of services in the different networks 2. The way services are provisioned in the different networks. Each network may support its own call origination features such as a speed dialing list, extension-only dialing capabilities, etc. Normally such call origination features are separate to the different networks. That is, a subscriber that initiates a call from a telephone outside of the network where the desk phone is subscribed, e.g. a general PSTN supported telephone or a cellular telephone, will not be able to utilize the same call origination features made available to that subscriber's desk phone. Therefore, a need exists to provide access to call origination features provided to a subscriber when the subscriber initiates calls from any one of his/her devices.

SUMMARY

It is an object of the present invention to satisfy this need.

An exemplary method provides access to call origination features contained in an internet protocol multimedia subsystem (IMS) for a subscriber of the IMS who originates a call request from customer premises equipment (CPE) either inside or outside of the IMS. The call request is received at a public service identity (PSI) server in the IMS with a phone number to which the call request is routed. An IMS internal desk number for the subscriber is retrieved based on the calling party number of the outside CPE. A first modified call request is transmitted from the PSI server to a telephony application server (TAS) identifying the IMS internal desk number as a request universal resource identity (RURI). Call origination treatment as specified by the subscriber is performed by the TAS. The first modified call request is processed by the TAS to form a second modified call request in which the RURI is a number of a destination party and a P-asserted identity (PAID) is the IMS internal desk number such that the second modified call request appears as if it was initiated from a phone (the subscriber's desk number) within the IMS. The second modified call request is transmitted to a node in the IMS for further processing and ultimately termination at the destination party.

An illustrative apparatus is used to implement the above exemplary method.

DESCRIPTION OF THE DRAWINGS

Features of exemplary implementations of the invention will become apparent from the description, the claims, and the accompanying drawings in which:

DETAILED DESCRIPTION

Figure 1:
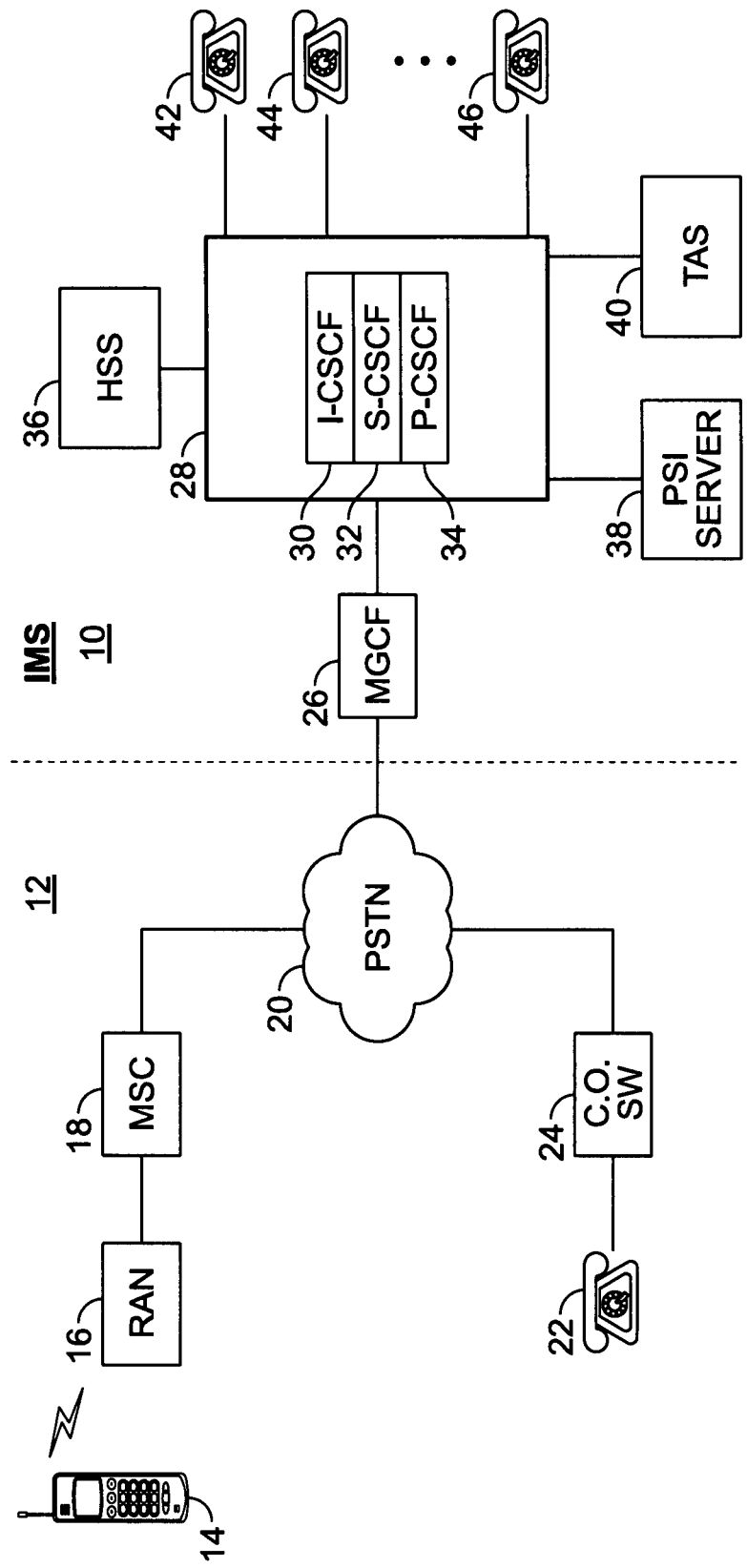
FIG. 1 is a block diagram of a telephony system in accordance with an embodiment of the present invention.

FIG. 1 shows a telephony system that includes a subscriber's desk phone that may reside in a private telephone subsystem, an Internet protocol multimedia subsystem (IMS), 10 and a public telephone network 12. Subscribers of IMS 10 are provided with selectable call origination features that are unique to their desk phone and the private telephone subsystem, e.g. dialing of internal desk phone numbers by only entering a 3 or 4 digit extension number, etc. Prior to the present invention, its subscribers could access the call origination features while at a telephone set, but were unable to access a call origination feature of this specific desk number and the private telephone system from a telephone set external to the IMS. It is a general objective in accordance with the present invention to provide to subscribers of the IMS network with access to call origination features provided by this network when the subscriber initiates a call from a telephone set external to the this network, in particular from a telephone set in the PSTN.

The illustrative public telephone network 12 includes a cellular telephone 14 that is supported by radio access node (RAN) 16 and mobile switching center (MSC) 18 that is connected to the private switched telephone network (PSTN) 20. Customer premises equipment (CPE), e.g. a POTS telephone set, 22 is supported by a central office switch 24 that is connected to the PSTN 20. Cellular telephone 14 and the CPE 22 merely represent a variety of communication devices that can be used in the public telephone network.

In describing the IMS 10, elements may be referred to as supporting identified functionality. It will be understood by those skilled in the art that this functionality is implemented by a corresponding apparatus or server. A media gateway control function (MGCF) 26 is coupled to the PSTN 20 and to a session manager 28 that includes an interrogating-call session control function (I-CSCF) 30, a serving call session control function (S-CSCF) 32 and a proxy call session control function (P-CSCF) 34. The session manager 28 is coupled to a home subscriber server (HSS) 36 which provides service profiles and manages authentication and registration status of users. The session manager 28 is also supported by a public service identity (PSI) server 38 and a telephony application server (TAS) 40. Telephone sets 42, 44 and 46 are coupled to the session manager 28 and have corresponding subscribers registered with IMS 10. These telephone sets are internal to IMS 10 and hence subscribers using these telephone sets have access to call origination features supported by the IMS 10.

Figure 2:
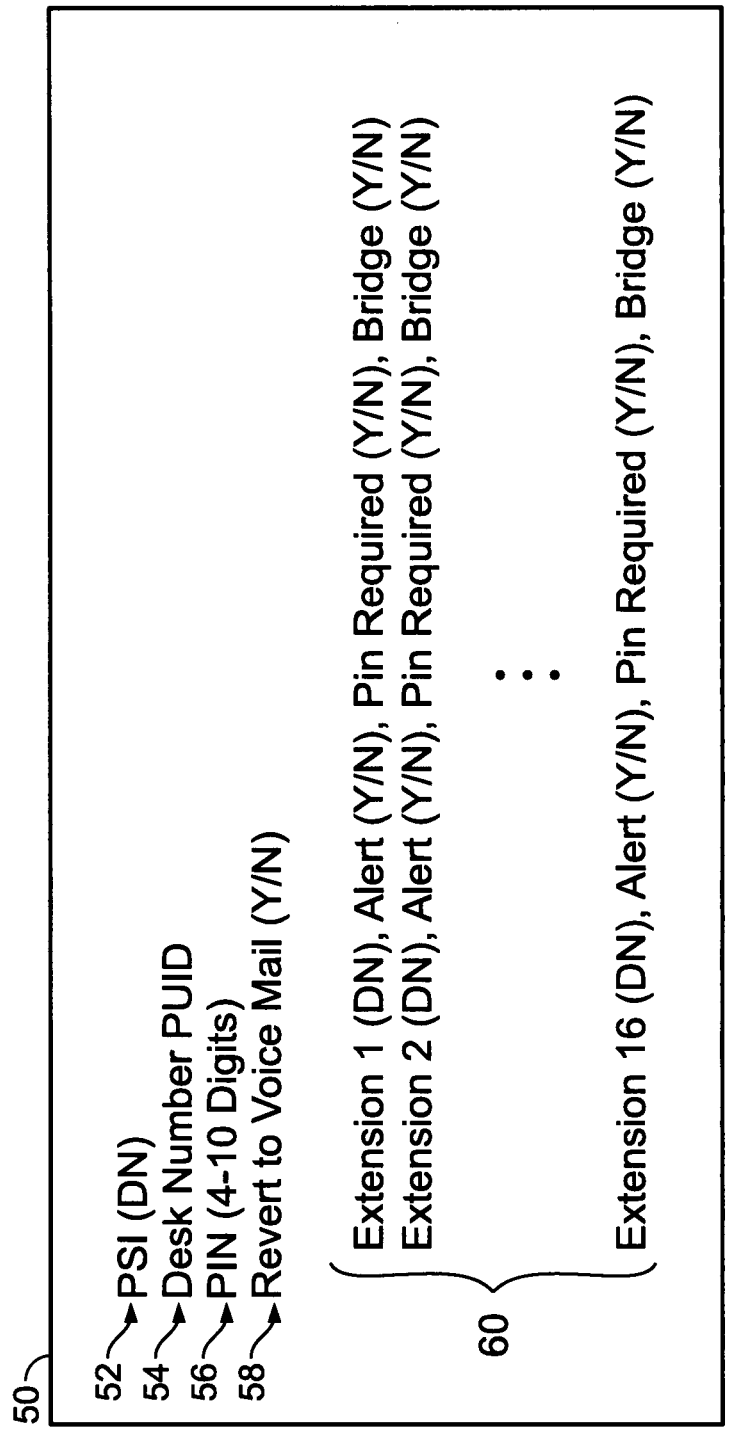
FIG. 2 illustrates an exemplary provisioning in accordance with an embodiment of the present invention.

FIG. 2 illustrates an exemplary record 50 that can be accessed by the PSI server 38 where the record is associated with a directory number (DN), i.e. the desk number, of a subscriber of IMS 10. The record provides provisioning internal to IMS 10 that enables a subscriber to identify one or more directory numbers of CPE external to the IMS 10 from which a subscriber of the IMS 10 can gain access to the IMS 10 in a manner that permits access to call origination features of the subscriber's desk number on the IMS 10.

The illustrative record 50 may include fields or entries 52-60 that contain corresponding information and/or data. Field 52 contains a PSI directory number that functions as a destination telephone number for PSI server 38 for calls initiated outside of the IMS 10. Field 54 contains the public user identification (PUID) of the subscriber's desk number, i.e. the publicly known DN for calls terminating to the subscriber in the IMS 10. Field 56 contains a personal identification number (PIN) of the subject subscriber that may in the example consist of 4-10 digits that can be selected by the subscriber. Field 58 contains a function selectable by the subscriber that determines whether a call origination from an extension dialing the desk number should be treated as an intercom call or as an attempt to access voice mail. Field 60 may include a plurality of entries, each associated with a different DN of CPE external to the IMS from which a subscriber may desire to gain access to the IMS 10 in accordance with an embodiment of the present invention. In field 60, "extension xx (DN)", the DN is directory number of a CPE outside of the IMS, e.g. phones 14 or 22; "alert (Y/N)" provides an election of whether the external DN is alerted upon a terminating call to the associated desk number; "PIN required (Y/N)" specifies whether the entry of the defined PIN must be entered in order to gain access from the external extension DN; "bridge (Y/N)" specifies whether a user at the associated directory number DN will be allowed to bridge into an existing call utilizing the desk phone or other extensions.

The following table defines several abbreviations used herein and in the figures.

| Abbreviation | Definition |
| --- | --- |
| CDPN | Called Party Number |
| CGPN | Calling Party Number |
| CPE | Customer Premises Equipment |
| DIV | Diversion Header |
| IMS | Internet protocol Multimedia Subsystem |
| I-CSCF | Interrogating Call Session Control Function |
| MGCF | Media Gateway Control Function |
| OCN | Original Called party number |
| PAID | P-Asserted-Identity |
| PBX | Private Branch Exchange |
| PCN | P-Called-Party-Identity |
| P-CSCF | Proxy Call Session Control Function |
| PIN | Personal Identification Number |
| POTS | Plain Old Telephone Service |
| PSI | Public Service Identity |
| PSTN | Public Switched Telephone Network |
| PUID | Public User Identification |
| RURI | Request Universal Resource Identity |
| S-CSCF | Serving Call Session Control Function |
| TAS | Telephony Application Server |

Figure 3:
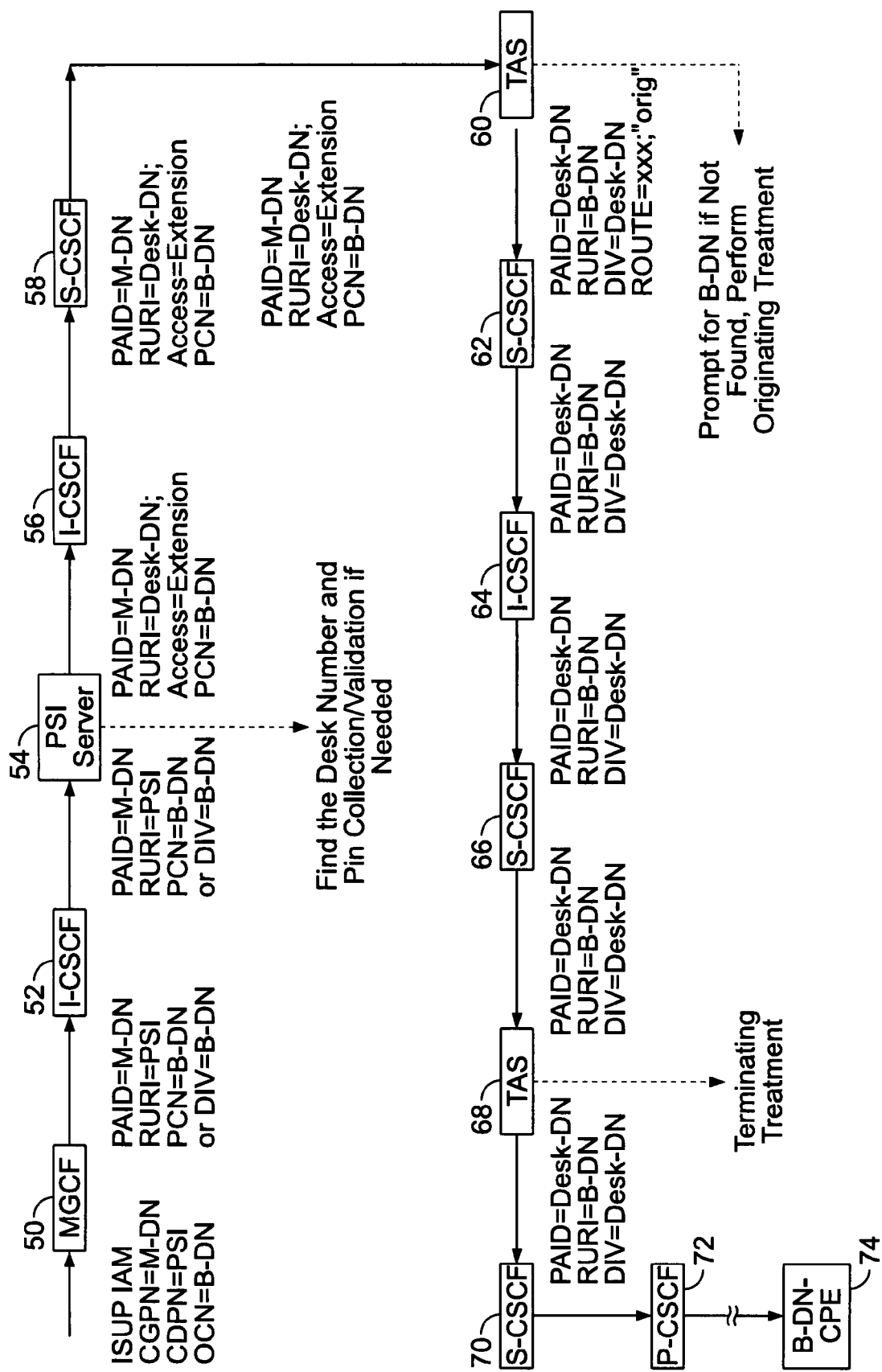
FIG. 3 is a signal flow diagram in accordance with an embodiment of the present invention.

FIG. 3 is a signal flow diagram of an illustrative embodiment of the present invention. In this embodiment a subscriber of IMS 10, having previously completed provisioning such as shown in FIG. 2 for external DNs, initiates a call from an external telephone having one of the provisioned external DNs. The subscriber desires to use call origination features of IMS 10, e.g. extension only dialing, even though he is initiating the call from cellular handset 14 that has its DN entered as extension 1 of field 60.

In this example the cellular system that supports handset 14 includes a "hot line feature", i.e. where an originating call from handset 14 is routed to a predetermined telephone number no matter what destination telephone number is manually entered by the user. In this case the hot line number to which the call is routed is the phone number for PSI server 38. A call request made from a service with a hot line feature is placed to the predetermined destination telephone number, but also contains the number entered by the subscriber and the calling party's phone number.

Referring to FIG. 3, the IMS subscriber initiates the illustrative call request from cellular handset 14. The call request is routed by RAN 16, MSC 18, and PSTN 20 to the MGCF 26. In order to facilitate understanding of the call flow, the nodes are numbered to reflect the call sequence. However, these elements correspond to the same named physical elements shown in the IMS of FIG. 1. The call request is received by MGCF 50 as an integrated services digital network user part (ISUP) initial address message (IAM). This message contains the calling party number (CGPN) of the cellular handset 14, i.e. mobile directory number (M-DN), the called party number (CDPN) of the phone number of the PSI server, and the original called party number (OCN) entered by the subscriber of the actual destination party (B-DN).

The MGCF 50 generates a corresponding SIP INVITE call request message that is transmitted to the I-CSCF 52. In this message, the M-DN is identified as the P-Asserted Identity (PAID), the PSI number identified as the Request Universal Resource Identity (RURI), and the B-DN identified as the P-Called-Party identity (PCN) or the Diversion header (DIV). The I-CSCF 52 queries the HSS 36 based on the identified RURI and determines the associated PSI server 54 (PSI server 38 in FIG. 1) to which the call request will be routed. The PSI server queries an associated database based on the received M-DN to identify the corresponding subscriber's desk number, i.e. the number/line of the IMS subscriber corresponding to the call originating subscriber. The server will also prompt for and validate a PIN from the originating subscriber, if a PIN is required in accordance with the corresponding record.

The PSI server 54 transmits a further call request message to I-CSCF 56. In this message the PAID remains the M-DN and the PCN continues to identify the B-DN, but the RURI is identified as the desk DN and an access is identified by the extension number associated with the M-DN. The I-CSCF 56 in turn routes the message to S-CSCF 58 which in turn routes it to TAS 60.

One of the tasks of the TAS 60 is to effectively change in the call request from an incoming call termination to an outgoing call origination. This is accomplished by transmitting a call message to the S-CSCF 62 in which: PAID=desk DN; RURI=B-DN; DIV=desk DN; with a Route header identified as "orig", i.e. a call origination. Also the TAS 60 will prompt the originating subscriber to manually enter the B-DN if the B-DN is not contained in part of the message received by the TAS. Although the B-DN is received as part of the call request message by the TAS 60 in this embodiment, the B-DN may not be received as part of the call request message by the TAS 60 as will be explained later with regard to another embodiment.

The S-CSCF 62 determines how the call to B-DN should be routed. B-DN could identify another subscriber within the same IMS, a subscriber within another IMS or a PSTN user. In this example, that B-DN identifies a subscriber on the same IMS and as such, the S-CSCF 62 transmits the call origination message request to I-CSCF 64 which in turn routes the request to the S-CSCF 66 and then to TAS 68. The same TAS 40 may serve as TAS 60 and TAS 68. Alternatively, TAS 60 and TAS 68 may be implemented by two separate servers in the IMS (not shown in FIG. 1). The TAS 68 generates a call origination request message transmitted to S-CSCF 70 in which: PAID=desk DN; RURI=B-DN; DIV=desk DN. Call path routing proceeds with this call origination request message being transmitted from S-CSCF 70 to P-CSCF 72 that functions as a proxy causing the call origination request to be normally processed concluding in a termination at the CPE with the B-DN showing the call origination having come from the desk DN. The CPE with the B-DN may reside internal or external of the IMS.

Because the TAS 60 effectively switches the incoming call termination of cellular handset 14 into a call origination from the corresponding desk DN, the TAS can also provide any call origination features and services that would have been supplied to the subscriber had the call been actually originated from the CPE associated with the desk DN. Thus the IMS subscriber is provided access to call origination features and services even when originating calls from a CPE outside of the IMS.

In an alternative embodiment a subscriber of the IMS desires to make use of call origination features supported by the IMS while initiating the call from a CPE external to the IMS. In this example the subscriber initiates a call from CPE 22 which is supported by telecommunication infrastructure that does not support a hot line feature. In this scenario the subscriber dials the phone number associated with the PSI server, wherein the call was routed by the central office switch 24 and PSTN 20 to the IMS 10 containing PSI server 38. As explained in FIG. 3, the PSI server 54 locates the desk number in the record shown in FIG. 2 associated with the previously provisioned external extension from which the subscriber is calling. The call proceeds to TAS 60 as explained for the above embodiment. Because a final destination number (B-DN) will not be contained in the call request message in this embodiment, the TAS 60 will prompt the originating subscriber to enter the B-DN and receive the B-DN as entered from the subscriber. Now that the actual destination number has been obtained by the TAS 60, the call request is routed and proceeds as explained for the above embodiment. Thus, the subscriber can access call origination features and services provided by the IMS 10 even when originating an external call from a CPE in a system that does not support a hot line feature.

Although exemplary implementations of the invention have been depicted and described in detail herein, it will be apparent to those skilled in the art that various modifications, additions, substitutions, and the like can be made without departing from the spirit of the invention. For example, the functions performed by one or more of the IMS elements can be integrated into another element so that the latter is capable performing all the associated functions. The described steps and signal flows may be performed in a different order, combined together to form fewer steps or signal flows, and/or certain steps or signal flows may be omitted depending on the capabilities of the supporting infrastructure.

The scope of the invention is defined in the following claims.

We claim:

1. A method for providing access to call origination features contained in an internet protocol multimedia subsystem (IMS) for a subscriber of the IMS who originates a call request from customer premises equipment (CPE) outside of the IMS, the method comprising the steps of:
   receiving the call request at a public service identity (PSI) server that resides within the IMS where the PSI server has a phone number to which the call request is routed;
   retrieving by the PSI server an IMS internal desk number based on a number of the CPE received as part of the call request;
   transmitting a first modified call request from the PSI server to a telephony application server (TAS) where the first modified call request identifies the IMS internal desk number as a request universal resource identity (RURI);
   performing, by the TAS, call origination treatment as specified by the subscriber based on the first modified call request;
   processing the first modified call request by the TAS to form a second modified call request in which the RURI is a number of a destination party and a P-asserted identity (PAID) is the IMS internal desk number such that the second modified call request appears as if it has been originally initiated from a phone within the IMS;
   transmitting the second modified call request to a node in the IMS for further processing and ultimately termination at the destination party.

2. The method of claim 1 where the first modified call request identifies the number of the CPE as the PAID.

3. The method of claim 1 further comprising generating the call request at the CPE in accordance with a hot line feature where the call request contains an RURI as the number of the PSI, the PAID is the number of the CPE, and the number of a destination party is also included.

4. The method of claim 1 further comprising transmitting a prompt by the PSI server to the originating subscriber at the CPE for the number of the destination party, and receiving the number of the destination party as input by the originating subscriber on the CPE in response to the prompt.

5. A system configured to provide access to call origination features contained in an internet protocol multimedia subsystem (IMS) for a subscriber of the IMS who originates a call request from customer premises equipment (CPE) outside of the IMS, the system comprising:
   a public service identity (PSI) server that resides within the IMS where the PSI server has a phone number to which the call request is routed, the PSI server configured to:
      receive the call request;
      retrieve an IMS internal desk number based on a number of the CPE received as part of the call request; and
      transmit a first modified call request to a telephony application server (TAS) where the first modified call request identifies the IMS internal desk number as a request universal resource identity (RURI); and
   the TAS configured to:
      provide call origination treatment as specified by the subscriber based on the first modified call request;
      generate, based on the first modified call request, a second modified call request in which the RURI is a number of a destination party and a P-asserted identity (PAID) is the IMS internal desk number such that the second modified call request appears as if it was originally initiated from a phone within the IMS; and
      forward the second modified call request to a node in the IMS for further processing and ultimately termination at the destination party.

6. The system of claim 5 where the PSI server is further configured to generate the first modified call request that identifies the number of the CPE as the PAID.

7. The system of claim 5 where the call request is generated in accordance with a hot line feature and where the call request contains an RURI as the number of the PSI, the PAID is the number of the CPE, and the number of a destination party is also included.

8. The system of claim 5 where the PSI server is further configured to:
- transmit a prompt to the originating subscriber at the CPE for the number of the destination party; and
- receive the number of the destination party as input by the originating subscriber on the CPE in response to the prompt.

9. A method for providing access to call origination features contained in an internet protocol multimedia subsystem (IMS) for a subscriber of the IMS who originates a call request from a telephone outside of the IMS to a call termination party, the method implemented by the IMS comprising the steps of:
- receiving the call request at an IMS server where the IMS server has a phone number to which the call request is routed;
- retrieving an internal IMS number based on a number of the telephone received as part of the call request;
- performing, as specified by the subscriber associated with the internal IMS number, origination of the call using an IMS supported call origination service where the call origination service is one of speed dialing, three-way conference calling, and extension-only dialing of a termination telephone internally within the IMS;
- generating another call request that indicates it was originally initiated within the IMS and having a destination of the call termination party.

10. The method of claim 9 further comprising:
- the retrieving including identifying the internal IMS number as a request universal resource identity (RURI); and
- the generating including generating the another call request in which the RURI is a number of the call termination party and a P-asserted identity (PAID) is the internal IMS number such that the another call request appears as if it has been originally initiated within the IMS, the another call request seeking call termination at the call termination party.

11. The method of claim 10 where the number of the telephone is identified as the PAID.

12. The method of claim 10 further comprising the call request being received from the telephone in accordance with a hot line feature where the call request contains an RURI as the number of a public service identity (PSI), the PAID is the number of the telephone, and the number of the call termination party is also included.

13. The method of claim 10 further comprising transmitting a prompt by the IMS server to the originating subscriber at the telephone for the number of the call termination party, and receiving the number of the call termination party as input by the originating subscriber on the telephone in response to the prompt.

14. The method of claim 9 wherein the call request is an inbound call to the IMS and the another call request is an outbound call from the IMS.

15. The method of claim 1 wherein the first modified call request is an inbound call to the IMS and the second modified call request is an outbound call from the IMS.

16. The system of claim 5 wherein the TAS is further configured to treat the first modified call request as an inbound call to the IMS and the second modified call request as an outbound call from the IMS.

17. The method of claim 9 wherein the step of performing the call origination feature comprises providing access to the call origination telephone outside of the IMS to any IMS supported call origination service normally provided to telephones internally within the IMS.

18. The method of claim 1 wherein the step of performing call origination treatment comprises providing access to the CPE outside of the IMS to any IMS supported call origination service normally provided to telephones internally within the IMS.

* * * * *

UNITED STATES PATENT AND TRADEMARK OFFICE
CERTIFICATE OF CORRECTION

| | | |
|---|---|---|
| PATENT NO. | : 8,681,960 B2 | Page 1 of 1 |
| APPLICATION NO. | : 11/897283 | |
| DATED | : March 25, 2014 | |
| INVENTOR(S) | : Amport et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1846 days.

Signed and Sealed this
Twenty-third Day of June, 2015

Michelle K. Lee
*Director of the United States Patent and Trademark Office*